United States Patent
Dwarkha et al.

(10) Patent No.: US 9,647,956 B2
(45) Date of Patent: May 9, 2017

(54) METHOD AND SYSTEMS FOR DYNAMIC ALLOCATION OF NETWORK RESOURCES

(71) Applicant: Vonage America Inc., Holmdel, NJ (US)

(72) Inventors: Rohan Dwarkha, Mendham, NJ (US); Alan Bugos, Westford, MA (US)

(73) Assignee: Vonage America Inc., Holmdel, NJ (US)

(*) Notice: Subject to any disclaimer, the term of this patent is extended or adjusted under 35 U.S.C. 154(b) by 0 days.

(21) Appl. No.: 14/502,047

(22) Filed: Sep. 30, 2014

(65) Prior Publication Data

US 2016/0094479 A1 Mar. 31, 2016

(51) Int. Cl.
*H04L 12/927* (2013.01)
*H04L 12/801* (2013.01)

(52) U.S. Cl.
CPC ............ *H04L 47/801* (2013.01); *H04L 47/12* (2013.01)

(58) Field of Classification Search
CPC .. H04M 3/367; H04M 3/5166; H04M 3/5191; H04M 3/523; H04M 3/5237; H04L 47/801; H04L 47/12
See application file for complete search history.

(56) References Cited

U.S. PATENT DOCUMENTS

| | | | |
|---|---|---|---|
| 7,602,725 B2 | 10/2009 | Vaught | |
| 8,477,926 B2 * | 7/2013 | Jasper et al. | 379/221.01 |
| 2004/0192341 A1 | 9/2004 | Wang et al. | |
| 2008/0180246 A1 * | 7/2008 | Malik | G06K 7/0008 340/572.1 |
| 2008/0186846 A1 * | 8/2008 | Stephenson et al. | 370/230 |
| 2014/0003236 A1 * | 1/2014 | Bajpai | H04W 28/0236 370/231 |
| 2014/0185581 A1 | 7/2014 | Senarath et al. | |

FOREIGN PATENT DOCUMENTS

WO   WO 2010/017176 A1   2/2010

* cited by examiner

*Primary Examiner* — Ayaz Sheikh
*Assistant Examiner* — Debebe Asefa
(74) *Attorney, Agent, or Firm* — Moser Taboada; Joseph Pagnotta (57) ABSTRACT

Methods and systems for dynamic allocation of network resources for optimized voice capacity and quality management are provided herein. In some embodiments, a method for dynamic allocation of network resources for optimized voice capacity and quality management may include providing; monitoring real-time call metrics and real-time network traffic capacity usage of a plurality of network devices having a network traffic capacity; and adjusting the network traffic capacity based on at least one of an analysis of historical network traffic, an analysis of the real-time call metrics, or an analysis of the real-time network traffic capacity usage, wherein adjusting network capacity comprises one of activating additional network devices to increase the network traffic capacity or deactivating one or more of the plurality of network devices to decrease the network traffic capacity.

21 Claims, 5 Drawing Sheets

METHOD AND SYSTEMS FOR DYNAMIC ALLOCATION OF NETWORK RESOURCES

BACKGROUND

Field

Embodiments of the present invention generally relate to methods and systems for network resource allocation and, more specifically, to a method and systems for dynamic allocation of network resources for optimized voice capacity and quality management.

Description of the Related Art

Enterprise, public, and private cloud services involved in the processing of real-time protocol (RTP) and media packets of a Voice over Internet Protocol (VoIP) network are expensive to operate and manage. Traffic and usage patterns are cyclical (i.e., periodic) with peaks and troughs throughout times of day (ToD) and week (ToW). Cloud resources such as CPU, memory, and storage may sit idle at a cost to the user (or enterprise). Performance impacts to call quality are typically based on where and how many resources are activated at any particular time. Systems/networks are designed and built to handle "peak" performance.

Currently, when network traffic nears capacity, existing bandwidth that is allocated for use by others is reallocated to handle additional voice traffic. However, reallocation of bandwidth does not increase network capacity. Rather, it provides more bandwidth to the requestor at the expense of other providers. In addition, although the network may not be near capacity, call quality on the network may be suffering, where the call quality could be improved by an increase in a number of network resources.

Thus, there is a need for a method and system to provide a better way of dynamically allocating network resources for optimized voice capacity and quality management.

SUMMARY

Methods and systems for dynamic allocation of network resources for optimized voice capacity and quality management are provided herein. In some embodiments, a method for dynamic allocation of network resources for optimized voice capacity and quality management may include monitoring real-time call metrics and real-time network traffic capacity usage of a plurality of network devices having a network traffic capacity; and adjusting the network traffic capacity based on at least one of an analysis of historical network traffic, an analysis of the real-time call metrics, or an analysis of the real-time network traffic capacity usage, wherein adjusting network capacity comprises one of activating additional network devices to increase the network traffic capacity or deactivating one or more of the plurality of network devices to decrease the network traffic capacity.

In some embodiments, a system for dynamic allocation of network resources for optimized voice capacity and quality management may include a control manager configured to monitor real-time call metrics and real-time network traffic capacity usage of a plurality of network devices having a network traffic capacity; and adjust the network traffic capacity based on at least one of an analysis of historical network traffic, an analysis of the real-time call metrics, or an analysis of the real-time network traffic capacity usage, wherein adjusting network capacity comprises one of activating additional network devices to increase the network traffic capacity or deactivating one or more of the plurality of network devices to decrease the network traffic capacity.

In some embodiments, a computer readable medium is disclosed. The computer readable medium stores computer instructions that, when executed by at least one processor causes the at least one processor to perform the method for dynamic allocation of network resources for optimized voice capacity and quality management.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to methods and systems for dynamic allocation of network resources for optimized voice capacity and quality management. More specifically, embodiments of the present invention facilitate the activation and subsequent de-activation of cloud resources on-demand based on historic traffic trends, real-time call quality, traffic metrics, and real-time analytics. Call detail records (CDRs) relating to telephony communication are analyzed to determine trends in network traffic. For example, CDR analysis may indicate a trend of a significant increase in call volume from 5 pm-7 pm on weekdays. This metric may be used to predict a need for additional resources, such as SIP proxy servers, media relays, or session border controllers from 5 pm-7 pm. As such, additional resources may be activated prior to 5 pm and subsequently deactivated after 7 pm in order to manage network services more efficiently.

In addition to predicting resource requirements, real-time call quality metrics may be used separately, or in combination with historic metrics, to activate or deactivate resources in real-time. For example, real-time traffic data is used to identify where and/or how many resources to activate or deactivate. In another example, real-time metrics may indicate that resources in an area of the network are impaired. In response, additional resources may be activated in another area of the network that is not impaired, while resources may be deactivated in the area of the network that is impaired. Thus, network traffic may be routed to the area of the network that has additional resources activated. Any metrics, singularly or aggregated, may be used to assess the call quality, quality of service, and real-time VoIP media traffic. Metrics may include, but are not limited to, daily traffic and minutes of use (MOU), call setup per second (CPS), simultaneous sessions, peak simultaneous sessions, actual call duration (ACD), answer seizure ratio (ASR), network efficiency ratio (NER), impaired calls, blocked calls, attempts, call count, mean opinion score (MOS), call details records (CDRs), call impairments including one-way audio, no audio, dropped audio, excluded calls, as well as IP statistics including latency, high jitter, high packet loss, and the like. Advantageously, the activation of network resources results in improved call quality, while deactivation of unneeded network resources results in a reduction in overall operating costs and improved network efficiency.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VOIP system, VOIP telephony system, IP system and IP telephony system are all intended to refer to a system that connects callers and that delivers data, text and video communications using Internet protocol data communications. Those of ordinary skill in the art will recognize that embodiments of the present invention are not limited to use with IP telephony systems and may also be used in other systems.

Figure 1:
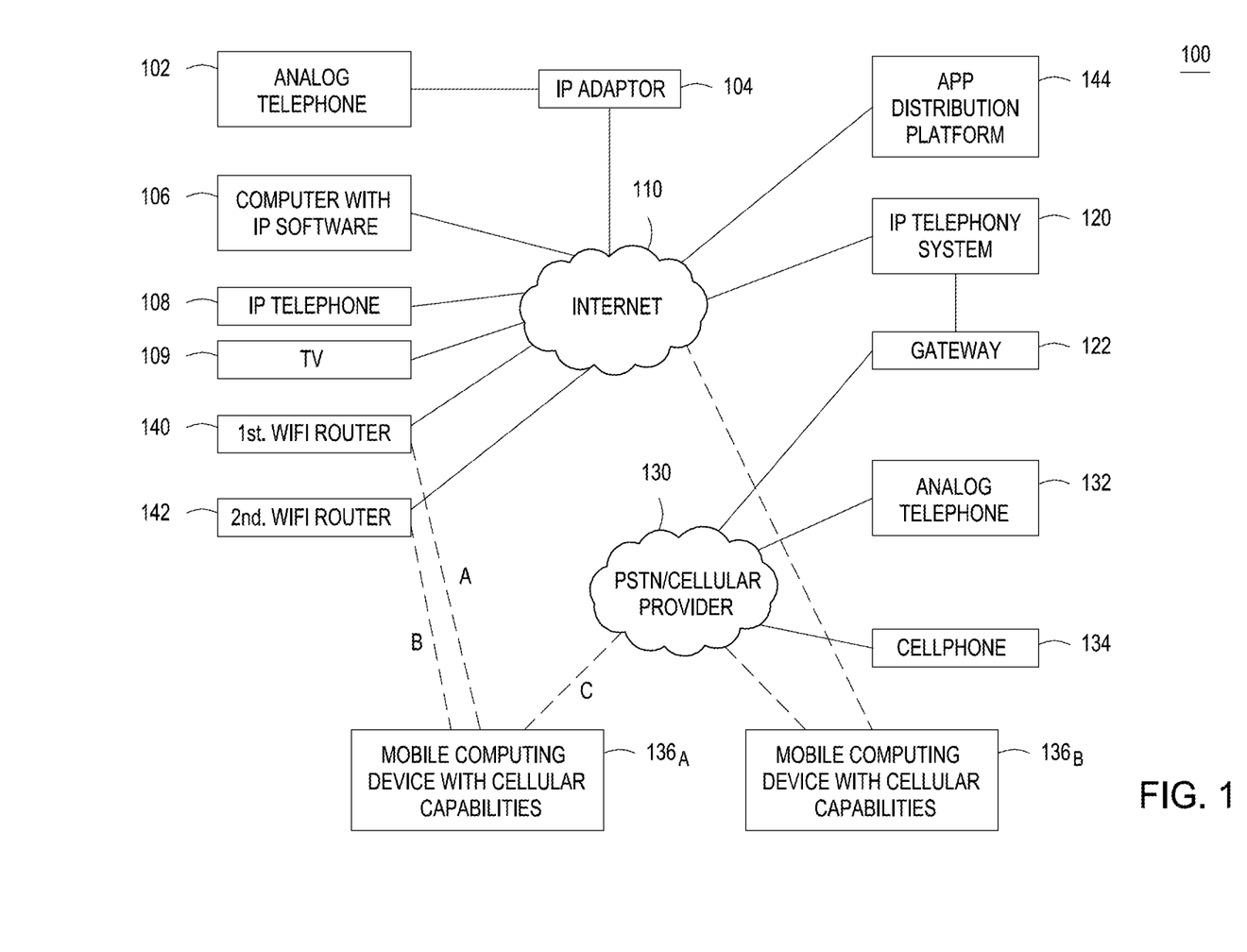
FIG. 1 depicts a block diagram of a telecommunication network, according to one or more embodiments of the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize a packet-switched network of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 or a television 109 to place and receive IP based telephone calls, and to access other IP telephony systems (not shown). The computer 106 may be a personal computer (PC), a tablet device, a gaming system, and the like. In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate voice based session calls, and an IP telephone that can facilitate data based session calls.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate application software to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities 136A (e.g., a smartphone) is capable of establishing a first wireless data connection A with a first wireless access point 140, such as a WiFi or WiMax router. The first wireless access point 140 is coupled to the Internet 110. Thus, the mobile computing device 136A can establish a VOIP telephone call with the IP telephony system 120 via a path through the Internet 110 and the first wireless access point 140.

FIG. 1 also illustrates that the mobile computing device 136A can establish a second wireless data connection B with a second wireless access point 142 that is also coupled to the Internet 110. Further, the mobile computing device 136A can establish either a third wireless data connection C via a packet-switch network provided by a cellular service provider 130 using its cellular telephone capabilities, or establish a voice based session telephone call via a circuit-switched network provided by a cellular service provider 130. The mobile computing device 136A could also establish a VoIP telephone call with the IP telephony system 120 via the second wireless connection B or the third wireless connection C.

Although not illustrated in FIG. 1, the mobile computing device 136A may be capable of establishing a wireless data connection to a data network, such as the Internet 110, via alternate means. For example, the mobile computing device 136A might link to some other type of wireless interface using an alternate communication protocol, such as the WIMAX standard.

Similarly, mobile computing device with cellular capabilities 136B may also be coupled to internet 110 and/or cellular service provider 130. In some embodiments, mobile computing device 136B may be connected to Internet 110 via a WIFI or WIMAX connection, and the like, and can also establish a VOIP telephone calls with the IP telephony system 120 similar to mobile computing device 136A. In embodiments of the present invention, communications environment 100 may be used to establish voice based or data based telecommunications sessions between mobile computing device 136A and mobile computing device 136B, depending on various criteria associated with each of the mobile computing devices, as will be described below in more detail.

In the embodiments described above, a device may act as a mobile telephony device once it is configured with appropriate application software that may be downloaded from an app distribution platform 144. For example, mobile computing device 136A may download a VOIP mobile app from app distribution platform 144 and install the VOIP mobile app on mobile computing device 136A.

Figure 2:
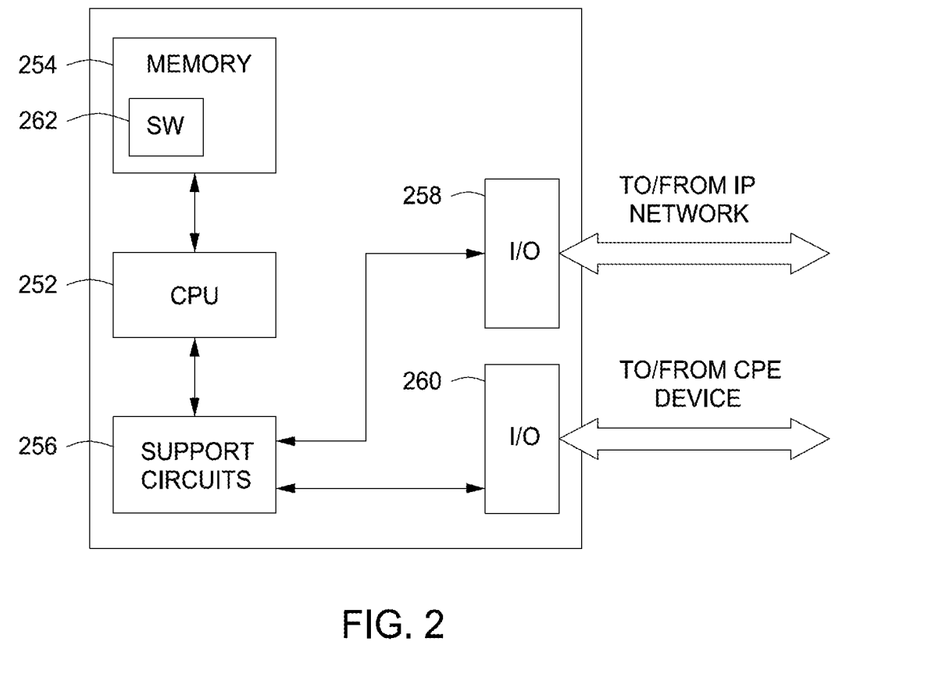
FIG. 2 is a block diagram of various elements of a processor that forms part of an Internet Protocol (IP) telephony system, according to one or more embodiments of the invention.

FIG. 2 illustrates elements of a computer processor 250 that can be used as part of the IP telephony systems 120 to accomplish various functions. The IP telephony systems 120 could include multiple processors 250 located at various locations in the system, along with their operating components and programming, each carrying out a specific or dedicated portion of the functions performed by the IP telephony system 120.

The processor 250 shown in FIG. 2 may be one of any form of a general purpose computer processor used in accessing an IP-based network, such as a corporate intranet, the Internet or the like. The processor 250 comprises a central processing unit (CPU) 252, a memory 254, and support circuits 256 for the CPU 252. The processor 250 also includes provisions 258/260 for connecting the processor 250 to customer equipment and to service provider equipment, as well as possibly one or more input/output devices (not shown) for accessing the processor and/or performing ancillary or administrative functions related thereto. The provisions 258/260 are shown as separate bus structures in FIG. 2; however, they may alternately be a single bus structure without degrading or otherwise changing the intended operability of the processor 250.

The memory 254 is coupled to the CPU 252. The memory 254, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 256 are coupled to the CPU 252 for supporting the processor in a conventional manner. These circuits include cache, power supplies, clock circuits, input/output circuitry and subsystems, and the like.

A software routine 262, when executed by the CPU 252, causes the processor 250 to perform processes of the disclosed embodiments, and is generally stored in the memory 254. The software routine 262 may also be stored and/or executed by a second CPU (not shown) that is remotely located from the hardware being controlled by the CPU 252. Also, the software routine could also be stored remotely from the CPU. For example, the software could be resident on servers and memory devices that are located remotely from the CPU, but which are accessible to the CPU via a data network connection.

The software routine 262, when executed by the CPU 252, transforms the general purpose computer into a specific purpose computer that performs one or more functions of the IP telephony system 120. Although the processes of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routine 262 of the disclosed embodiments is capable of being executed on any computer operating system, and is capable of being performed using any CPU architecture.

In the following description, references will be made to an "IP telephony device." This term is used to refer to any type of device which is capable of interacting with an IP telephony system to complete a telephone call. An IP telephony device could be an IP telephone, a computer running IP telephony software, a telephone adapter which is connected to an analog telephone, or some other type of device capable of communicating via data packets. An IP telephony device could also be a cellular telephone or a portable computing device that runs a software client that enables the device to act as an IP telephone. Thus, a single device might be capable of operating as both a cellular telephone and an IP telephone.

Moreover, certain devices that are not traditionally used as telephony devices may act as telephony devices once they are configured with appropriate client software. Thus, some devices that would not normally be considered telephony devices may become telephony devices or IP telephony devices once they are running appropriate software. One example would be a desktop or a laptop computer that is running software that can interact with an IP telephony system over a data network to conduct telephone calls. Another example would be a portable computing device, such as an Apple iPod Touch™, which includes a speaker and a microphone. A software application loaded onto an Apple iPod Touch™ can then be run so that the Apple iPod Touch™ can interact with an IP telephony system to conduct a telephone call.

The following description will also refer to telephony communications and telephony activity. These terms are intended to encompass all types of telephone calls, regardless of whether all or a portion of the calls are carried in an analog or digital format. These terms are also intended to encompass data communications that are conveyed through a PSTN or VOIP telephony system, such as facsimile transmissions, text messages, SMS messages, MMS messages, video messages, and all other types of data communications sent by or received by a user. In other words, these terms are intended to encompass any communications whatsoever, in any format, which traverse all or a portion of a communications network or telephony network.

Methods of setting up telephony communications between a calling party and a called party will be described with reference to FIGS. 3-6. Part of those methods will include generating CDRs that include information about the telephony communications that can be used to bill for the communications, and which can also be used to verify that an IP system is being charged appropriately by third party service providers for their assistance in terminating telephony communications. Information in the CDRs is also used to monitor call quality, and for other diagnostic procedures. The methods will be used to explain how multiple CDRs that are generated for a single telephony communication can be correlated to yield the information needed to bill for the communications, to verify that third party charges are appropriate, and to monitor call quality.

Figure 3:
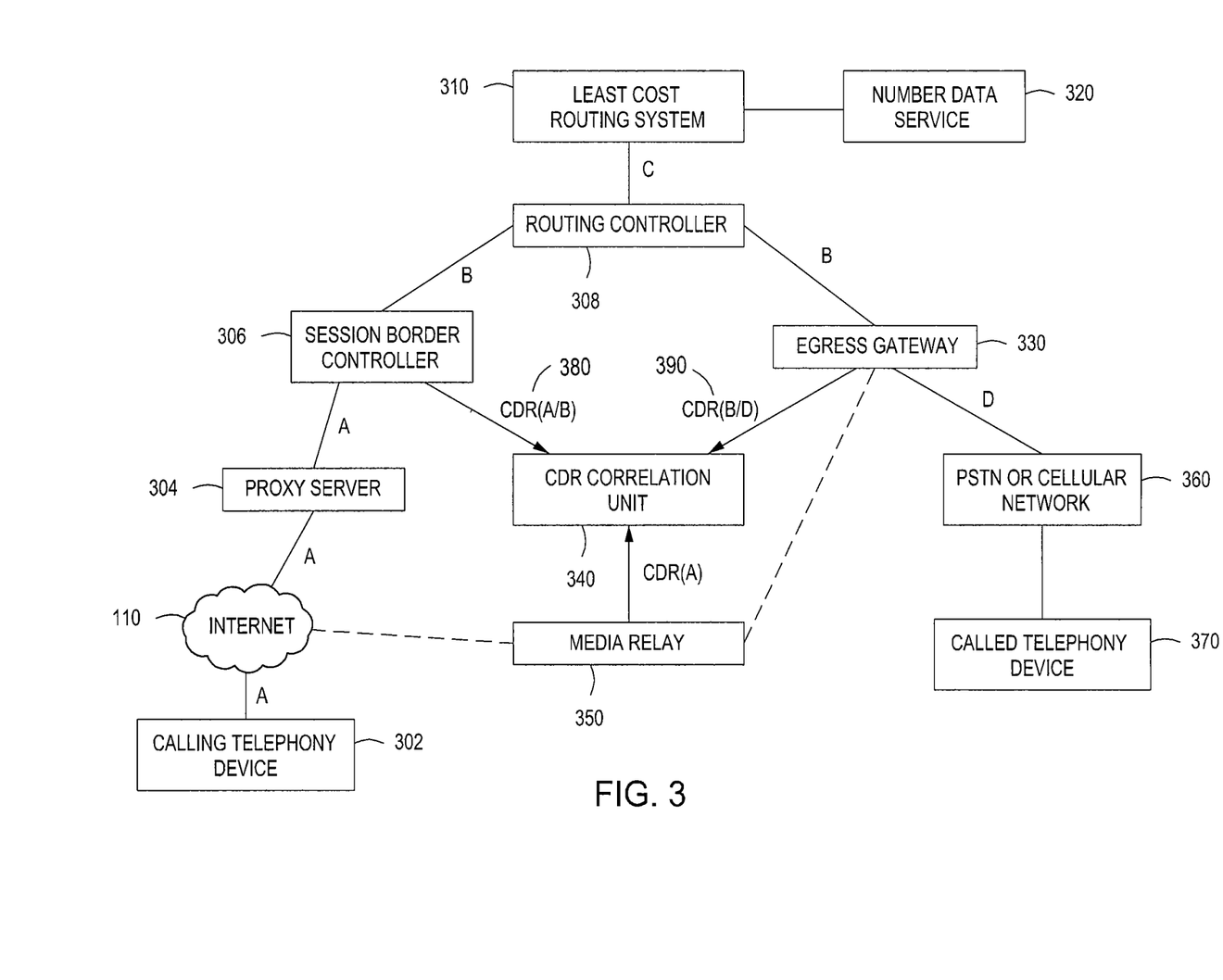
FIG. 3 depicts a block diagram illustrating various logical elements that are involved in implementing a call between a calling party's telephony device and a called party's telephony device; according to one or more embodiments of the invention.

FIG. 3 illustrates elements involved in setting up and carrying a telephony communication between a calling telephony device 302 and a called telephony device 370 in an IP telephony system such as the one described in FIG. 1. In FIG. 3, the calling telephony device 302 is coupled to the Internet 110. For example, the calling telephony device 302 might be a mobile computing device running an IP telephony application, where the mobile computing device is capable of wireless data communications. In alternate embodiments, the calling telephony device 302 might be an analog telephone that communicates through a PSTN or a cellular telephone that communicates through a cellular telephony network.

Also, in the embodiment illustrated in FIG. 3, the called party telephony device 370 is coupled to a PSTN or cellular network 360. The called telephony device 370 could be an analog telephone connected to a PSTN or a cellular telephone connected to a cellular telephony network. In alternate embodiments the called telephony device 370 could be an analog telephone that communicates through a VOIP adaptor, an IP telephone, or a computer running IP software. The called telephony device 370 might also be a mobile computing device capable of wireless data communications that is running an IP telephony application. In those alternate embodiments, the PSTN or cellular network 360 would be replaced with a data network, such as the Internet 110.

In the following description, an audio telephone call is setup between the calling telephony device 302 and the called telephony device 370. However, the concepts and procedures described below are equally applicable to other forms of telephony communications, such as text messages, video messages, video calls and other forms of communications known to those skilled in the art.

In the embodiment illustrated in FIG. 3, when a calling party using the calling telephony device 302 wishes to setup a telephone call with a called party using the called telephony device 370, the calling telephony device 302 sends a call setup request through the Internet 110, or via some other access network, to a proxy server 304. The call setup request includes information identifying the called party and/or the called telephony device 370. The identifying information is typically in the form of a telephone number assigned to the called telephony device 370. However, other identifying information besides a telephone number assigned to the called telephony device 370 could also be used.

This leg of the call setup request also includes a first call identification code represented by the letter "A" appearing in FIG. 3. The first call identification code A is assigned or generated by the calling telephony device 302.

The proxy server 304 contacts a session border controller (SBC) 306 for assistance in setting up the call. The communication passing from the proxy server 304 to the session border controller 306 also includes the information identifying the called party and/or the called party telephony device 370, as well as the first call identification code A assigned by the calling telephony device 302.

The session border controller 306 contacts a routing controller 308 for help in identifying an appropriate egress gateway or proxy server that is capable of sending the call setup request on to the called telephony device 370. As a result of this action, the session border controller 306 assigns a second call identification code B to this leg of the telephony communication. Communications passing from the session border controller 306 to the routing controller 308 only refer to this second call identification code B.

The routing controller 308 may contact a least cost routing system 310 and ask for the identity of one or more egress gateways or proxy servers that could be used to complete the call to the called telephony device 370. The routing controller 308 assigns a third identification code "C" to this leg of the telephony communication and the communications passing back and forth between the routing controller 308 and the least cost routing system 310 use this third identification code C.

Optionally, the least cost routing system 310 consults with a data service 320. The data service 320 provides information about whether a telephone number of the called telephony device 370 is still controlled by the original assigning entity or whether that telephone number has been ported to a new telephony services provider. This information can be helpful in determining the least cost way to route the call.

The routing controller 308 uses the information provided by the least cost routing system 310 to send a message to an appropriate egress gateway 330 or proxy server 304 capable of sending the call setup request on to the called telephony device 370. On this leg, the communications sent from the routing controller 308 to the egress gateway 330 include the second identification code B that was originally assigned by the session border controller 306.

The egress gateway 330 then uses information identifying the called party and/or the called telephony device 370 to contact a PSTN or cellular network 360 that is in communication with the called telephony device 370. At this leg of the call set up request, the egress gateway 330 assigns a fourth identification code "D" to the telephony communication. Finally, the PSTN or cellular network 360 contacts the called telephony device 370 to setup the call.

Assuming the call is answered, one or more of the logical devices involved in setting up the call can identify one or more media relays 350 through which data packets bearing the audio of the call can be routed. The dashed line appearing in FIG. 3 indicates the path traversed by data packets bearing the media of the call, whereas the solid lines in FIG. 3 illustrate the path traversed by the call setup signaling.

As noted above, when a call is setup in this fashion, multiple ones of the logical elements involved in setting up the call and carrying the media of the call may all generate their own CDRs containing data about the call. FIG. 3 illustrates that the session border controller 306 generates a first CDR 380 that is sent to a CDR correlation unit 340. Also, the egress gateway 330 generates a second CDR 390 that is also sent to the CDR correlation unit 340. Further, the media relay 350 generates a third CDR for the call that is sent to the CDR correlation unit 340.

If multiple media relays arranged in series are involved in transmitting the data packets bearing the media of the call, each media relay may generate its own CDR for the call. Further, a call might be switched from a first media relay to a second media relay partway through the call. In that instance, the first media relay would generate a first CDR 380 for a first portion of the call and the second media relay would generate a second CDR 390 for the second portion of the call.

The CDRs generated by all these logical elements include one or more of the identification codes generated by the logical elements handling the call. Since the logical elements refer to the same call by different identification codes, the identification codes are not the same in all of the CDRs. Moreover, each CDR may include both an ingress identification code and an egress identification code that correspond to ingress and egress "states" of one or more logical devices that create CDR's. For example, the session border controller 306 generates a CDR for the call which includes ingress identification code A, which was assigned by the calling telephony device 302, as well as egress identification code B that was assigned by the session border controller 306 itself. The egress gateway 330 generates a CDR that includes ingress identification code B forwarded from the routing controller 308, and egress identification code D that was assigned by the egress gateway 330 itself. Further, the media relay 350 generates a CDR that includes one or both of the identification code A assigned by the calling telephony device 302 and identification code D assigned by the egress gateway 330.

The CDR correlation unit 340 receives all of these CDRs, as well as many other CDRs generated by the same logical devices for different calls that are also being setup and carried by the same logical devices. Further, the CDR correlation unit also receives CDRs from other logical devices relating to other calls being setup and carried by those other logical devices. The CDR correlation unit must then determine which of the multiple received CDRs relate to the same call. Once that determination is made, it is possible to draw information from all of the multiple CDRs generated for the same call to accomplish billing functions, and to verify charges submitted by third party service providers. Also, the information contained in CDRs generated by the media relays (MR) may relate to call quality information. This information could be used by the system to determine how to route calls within the network, and/or how to improve call quality via a best IP path route.

The identification codes inserted into the CDRs can be used by the CDR correlation unit 340 to determine which of the CDRs relate to the same call. Although the CDRs may contain different identification codes, it is still possible to use this information to determine which CDRs are for a single call.

As noted above, the session border controller 306 generates a CDR for the call that includes ingress identification code A and egress identification code B. The egress gateway 330 generates a CDR with ingress identification code B and egress identification code D. By matching the egress identification code B in the CDR from the session border controller 306 with ingress identification code B in the CDR from the egress gateway 330, it is possible to determine that both CDRs relate to the same call. Likewise, by matching an identification code A or D in the CDR received from the media relay 350 with the identification codes in the CDRs received from the session border controller 306 and/or the egress gateway 330, it is possible to determine that the CDR received from the media relay 350 also relates to the same call.

In the short run, the identification codes generated by these logical elements will all be unique. However, over longer periods of time, the same identification codes may be re-used. For this reason, the time that the CDRs were generated may also be used to help match multiple CDRs that were generated for the same call.

Once the CDRs relating to the same call have been identified by the CDR correlation unit, this information could be used in various ways to help facilitate the resource allocation of cloud resources, such as SBCs and MRs.

In the foregoing description, an egress gateway 330 is used to connect the call to a PSTN or cellular service provider 360 that ultimately connects the call to the called telephony device 370. In alternate embodiments, the called telephony device 370 may be an IP telephony device that is capable of communicating with an IP telephony system via a data network. In those alternate embodiments, the egress gateway 330 is replaced with a proxy server that directly contacts the called telephony device 370 via a data network. Also, in those alternate embodiments, the called telephony device 370 would communicate directly with the media relay 350, via a data network, to communicate data packets bearing the media of the call. Data packets bearing the media of the call would not traverse the proxy server that replaces the egress gateway 330 in FIG. 3.

Also, in the foregoing description, the call is connected from the egress gateway 330 to the called telephony device 370 (via the PSTN or cellular network 360) on the first attempt to complete the call. It is also common for the first attempt to complete the call to fail. If the first attempt fails, in most cases additional attempts to complete the call will be made, either through the same egress gateway 330, or through an alternate egress gateway. Each call attempt will result in the generation of a CDR from the egress gateway attempting to complete the call. And, as explained above, each CDR generated by a call completion attempt will include an identification code that can be correlated to an identification code present in another CDR generated for the same call. Thus, the CDR correlation unit 340 is capable of identifying all of the CDRs generated by failed call completion attempts as belonging to the same call. The information provided by the CDRs from failed call completion attempts may be particularly helpful in troubleshooting and in identifying malfunctioning equipment.

Further, as described above, when the called telephony device is an IP telephony device communicating via a data network, the routing controller will attempt to complete the call through a proxy server, instead of the egress gateway 330 illustrated in FIG. 3. As explained above, it may be necessary to make multiple call completion attempts through multiple proxy servers before the call is completed to the called telephony device 370. Here again, each proxy server that attempts to complete the call will generate a CDR, and the CDR correlation unit 340 will be able to identify those CDRs as belonging to the same call using the identification codes in the CDRs.

The foregoing description identifies a few ways that various logical elements of an IP telephony system could operate to complete a call between a calling telephony device and a called telephony device. In alternate embodiments, calls could be completed in many other different ways, using different methods and using different logical devices. However, multiple CDRs are generated for the same telephony communication.

In some situations, the logical elements illustrated in FIG. 3 that generate the CDRs collected and analyzed by the CDR correlation unit 340 may all be part of an IP telephony system. In other instances, some of the logical elements may be part of some other system. For example, the egress gateway 330 that generates a CDR may be part of the IP telephony system that provides service to the calling telephony device 302, or it may be controlled by a third party that is paid by the IP telephony system to complete calls to called parties. Likewise, the media relay 350 may be part of the IP telephony system, or it may be controlled by a third party, and the IP telephony system may pay for use of the media relay 350. Regardless, the CDRs generated by those logical elements would still be received by the CDR correlation unit 340, or at least stored in a CDR database maintained by the IP telephony system.

In the description provided above, the routing controller 308 is used to help setup a call from the calling telephony device 302 to the called telephony device 370. The routing controller 308 may also generate a CDR for the call that includes identification code B, which was assigned by the session border controller 306 and/or identification code C, which is assigned by the routing controller 308 itself. In some instances, the information contained in a CDR generated by the routing controller 308 may be useful for analyzing network traffic trends.

Figure 4:
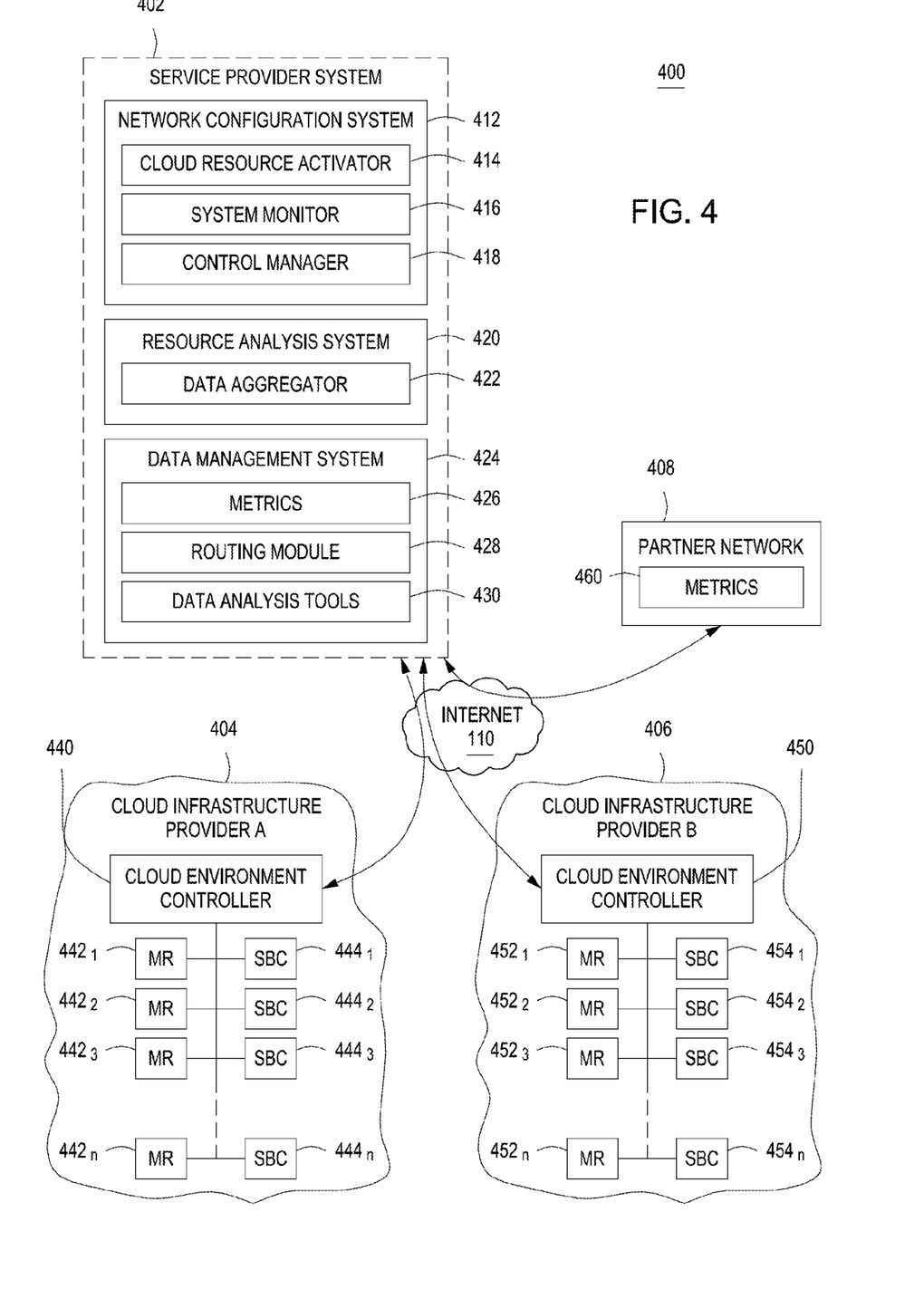
FIG. 4 depicts a block diagram of a system for dynamic allocation of network resources for optimized voice capacity and quality management, according to one or more embodiments.

FIG. 4 depicts a block diagram of a system 400 for dynamic allocation of network resources for optimized voice capacity and quality management, according to one or more embodiments. The system 400 comprises a service provider system 402 communicatively coupled to cloud infrastructure 404, cloud infrastructure 406, and partner network 408 via Internet 110. Cloud infrastructure 404 comprises cloud environment controller 240 that controls a plurality of cloud resources, such as media relays (MR) $442_1$, MR $442_2$, MR $442_3$, . . . MR $442_n$, collectively referred to as MR 442, (e.g. media relay 250) as well as session border controllers (SBC) $444_1$, SBC $444_2$, SBC $444_3$, . . . SBC $444_n$, collectively referred to as SBC 444 (e.g., session border controller 306). Similarly, cloud infrastructure 406 comprises cloud environment controller 450 that controls a plurality of cloud resources, such as media relays (MR) $452_1$, MR $452_2$, MR $452_3$, . . . MR $452_n$, collectively referred to as MR 452, (e.g. media relay 250) as well as session border controllers (SBC) $454_1$, SBC $454_2$, SBC $454_3$, . . . SBC $454_n$, collectively referred to as SBC 454 (e.g., session border controller 306).

In some embodiments, service provider system 402 may be a communication service provider, such as a VoIP service provider, that includes and maintains network configuration system 412, resource analytics system 420, and data management system 424. In other embodiments, network configuration system 412, resource analytics system 420, and data management system 424 may be separate entities that provide network configuration services to service provider system 402. The network configuration system 412 may include a cloud resource activator 414, a system monitor 416, and a control manager 418. In some embodiments, the resource analytics system 420 may include a data aggregator 422. In some embodiments, the data management system 424 may include metrics 426, a routing module 428, and data analysis tools 430.

In operation, information is received from the cloud environment controllers 440, 450 as well as from partner networks 408 that gather metrics 460 and send the information to the data management system 424. A partner network 408 may be any other service provider network outside of the service provider system 402 that is used to facilitate call connectivity. The partner network 408 may be a termination carrier for either inbound or outbound calls. The partner network 408 may be contracted to provide QoS metrics to the service provider system 402. The information received may include, but is not limited CPU usage, memory usage, call detail records (CDRs), and the like. The received information is analyzed using data analysis tools 430, to determine metrics 426 regarding trends in traffic/network usage, minutes of use (MOU), call setup per second (CPS), simultaneous sessions, peak simultaneous sessions, answer seizure ratio (ASR), call counts, call attempts, blocked calls, impaired calls, network efficiency ratio, mean opinion score (MOS), call impairments, such as one-way audio, no audio, dropped audio, excluded calls, latency high jitter, high packet loss, and the like. Information and data are received via network elements such as media relays, SBCs, SIP proxies, billing proxies, media gateways, core network routers and switches, end-user devices (Analog telephony adaptors ATA), mobile apps on smartphones, OSS servers, CDR servers, BSS servers, application servers, and other such network or call processing elements. This data typically uses common Simple Network Management Protocol (SNMP) transactions, where the available information is defined by management information bases (MIBs). Many VoIP service providers such as VONAGE®, aggregate and correlate this information in databases, enterprise data warehouses (EDW) and big data systems making the raw or processed data available for analytical tools, event processors, Quality of Service systems (tools), call metrics analytics, whereas after post-processing, is made available to operations and business analysts via detailed reports or web-based reporting tools. For example, the data aggregator 422 determines that historical data based on CDRs indicates a need to activate additional resources, such as additional MRs 442 and additional SBCs 444 from 5 pm-10 pm in cloud infrastructure 404 due to anticipated call volume. However, before the control manager 418 instructs the cloud resource activator 414 to activate additional resources, the control manager 418 receives real-time call metrics 426 from the system monitor 416 that indicate that the resources of the cloud infrastructure are impaired. As a result, control manager 418 instructs the cloud resource activator 414 to deactivate resources in cloud infrastructure 404, and activate MRs 452 and SBCs 454 in cloud infrastructure 406. The cloud resource activator 414 forwards instructions to deactivate cloud resources to cloud environment controller 440, which then deactivates one or more MRs 442 and/or SBCs 444. The cloud resource activator 414 also forwards instructions to cloud environment controller 450, which then activates one or more MRs 452 and/or SBCs 454. The routing module 428 may then route calls through cloud infrastructure 406 until cloud infrastructure 404 is no longer impaired.

Ongoing, the metrics 426 are gathered and used by the data aggregator 422 to identify whether predefined thresholds regarding call quality, quality of service (QoS), and/or network usage are being met at different times and/or locations throughout the network. In the event that network capacity is not an issue, but call quality is suffering in one area of the network, the control manager 418 instructs the cloud resource activator 414 to activate/deactivate network resources as described above in order to improve call and media processing (performance) and call quality throughout the network.

Figure 5:
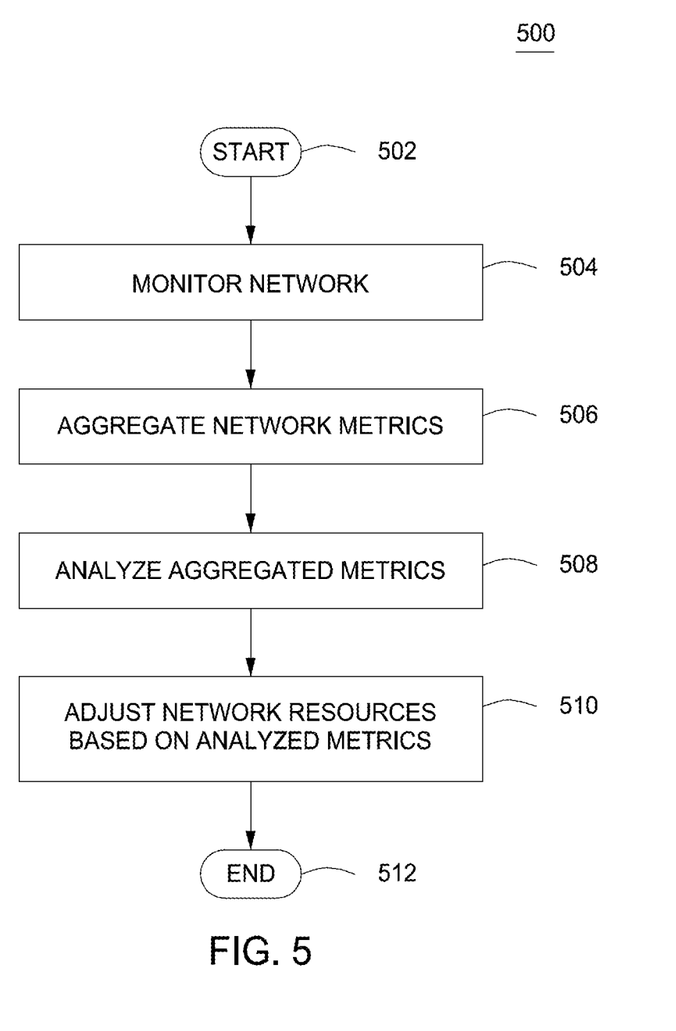
FIG. 5 depicts a flow diagram of a method for dynamic allocation of network resources for optimized voice capacity and quality management, according to one or more embodiments of the subject invention.

FIG. 5 depicts a flow diagram of a method 500 for dynamic allocation of network resources for optimized voice capacity and quality management, according to one or more embodiments. In the embodiments consistent with FIG. 5, a network, for example a VoIP network, is configured with a plurality of network resources, such as media relays, session border controllers, proxy servers, and the like. The quantity of active network resources affects the capacity of calls that can be routed through the network at a given time. Call quality, quality of service, as well as network capacity may be continually monitored on the network. The method 500 starts at step 502 and proceeds to step 504, where the network is monitored.

Metrics such as call setup per second (CPS), which is a measure of how many telephone calls can be handled in one second, simultaneous sessions, which are ongoing active SIP-VoIP sessions, actual call duration (ACD), answer seizure ratio (ASR), which is a measure of network quality based on call success rates, network efficiency ratio, which measures the ability of a network to deliver a call to a called terminal, impaired calls, blocked calls, call attempts, call counts, and call impairments, such as one-way audio, no audio, dropped audio, or excluded calls, and IP statistics such as latency, high jitter, and high packet loss.

At step 506, the data aggregator 422 aggregates the metrics. The metrics may be assessed singularly or aggregated in order to determine call-based performance and usage metrics. Some metrics determine trends that may be used to identify future network usage needs. Other metrics determine real-time states in call quality, QoS, and/or network usage.

At step 508, the control manager 418 analyzes the aggregated metrics to determine whether QoS has dropped below a pre-defined threshold, whether call quality has dropped below a pre-defined threshold, and/or whether network usage has exceeded a pre-defined threshold. If one of the aforementioned thresholds has been reached, additional network resources need to be activated in the network in order to improve call quality, quality of service, and/or to keep network usage from reaching maximum capacity. In addition, it may be necessary to activate additional cloud resources in one part of the network, while deactivating cloud resources in another part of the network, as described previously.

The aggregated metrics are also analyzed in order to predict, based on prior usage, times or locations in the network where call volume may increase significantly and require additional resources to be activated to handle the included call volume. In some embodiments, when QoS metrics or usage metrics meet a predefined threshold, additional resources will be activated. For example, if a rolling 30-day average QoS score for a 5 pm-7 pm window falls below a given threshold, additional resources will be activated to improve the QoS metrics for that time period. The additional resources may be deactivated when no longer required to meet the QoS threshold. In some embodiments, predictions are determined by heuristics regarding QoS and usage to learn patterns in call volume, change in connection quality (e.g., latency, jitter, etc.), and the like, thereby predicting a need to activate or deactivate resources in the network at given times and locations. That is, in some embodiments, the control manager 418 will employ learning algorithms to be used in call volume and QoS analysis, to predict call volumes and anticipated QoS of calls. For example, the control manager 418 may employ a neural network system to perform said predictive analysis.

At step 510, the control manager 418 instructs the cloud resource activator 414 where and when to activate and/or deactivate cloud resources in the network. Cloud resources include SIP proxies, media relays, and session border controllers. Instructions are sent to each cloud resource that is activated or deactivated. The cloud resources are automatically reconfigured to route calls through the newly activated cloud resources and away from any deactivated cloud resources. As such, although the network usage may not be near capacity, if the call quality on the network is degraded, additional resources are activated in order to improve call quality. The method 500 ends at step 512.

The embodiments of the present invention may be embodied as methods, apparatus, electronic devices, and/or computer program products. Accordingly, the embodiments of the present invention may be embodied in hardware and/or in software (including firmware, resident software, microcode, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java.®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for dynamic allocation of network resources for optimized voice capacity and quality management comprising:
    monitoring, by a control manager of a service provider system that includes at least one processor, real-time call metrics and real-time network traffic capacity usage of a plurality of network devices having a network traffic capacity; and
    adjusting, by the control manager, the network traffic capacity based on analysis of historical network traffic and at least one of an analysis of the real-time call metrics or an analysis of the real time network traffic capacity usage, wherein adjusting network capacity comprises one of activating additional network devices to increase the network traffic capacity or deactivating one or more of the plurality of network devices to decrease the network traffic capacity.

2. The method of claim 1, wherein activating one or more network devices includes sending instructions to each network device being activated.

3. The method of claim 1, further comprising routing network traffic using the activated additional network devices.

4. The method of claim 1, wherein deactivating on one or more network devices includes sending instructions to each network device being deactivated.

5. The method of claim 1, wherein real-time call metrics analysis comprises determining when one or more quality of service metrics exceeds a pre-defined threshold.

6. The method of claim 1, wherein historic analysis is based on call detail records.

7. The method of claim 1, wherein the network devices comprise at least one of SIP proxy servers, media relay servers, or session border control servers.

8. The method of claim 1, wherein real-time call metrics comprise at least one of call setup per second (CPS), simultaneous sessions, actual call duration (ACD), answer seizure ratio (ASR), network efficiency ratio, impaired calls, blocked calls, call attempts, call counts, one-way audio, no audio, dropped audio, excluded calls, and latency, high jitter, and high packet loss.

9. The method of claim 1, wherein the network resources are virtual machines or cloud based resources.

10. A system for dynamic allocation of network resources for optimized voice capacity and quality management comprises:
a control manager configured to monitor real-time call metrics and real-time network traffic capacity usage of a plurality of network devices having a network traffic capacity; and adjust the network traffic capacity based on analysis of historical network traffic and at least one of an analysis of the real-time call metrics or an analysis of the real-time network traffic capacity usage, wherein adjusting network capacity comprises one of activating additional network devices to increase the network traffic capacity or deactivating one or more of the plurality of network devices to decrease the network traffic capacity.

11. The system of claim 10, wherein the control manager is configured to adjust the network traffic capacity by sending instructions to each network device being activated.

12. The system of claim 10, wherein the control manager is further configured to route network traffic using the activated additional network devices.

13. The system of claim 10, the control manager is configured to adjust the network traffic capacity by sending instructions to each network device being deactivated.

14. The system of claim 10, wherein the control manager is configured to perform real-time call metrics analysis by determining when one or more quality of service metrics exceeds a pre-defined threshold.

15. The system of claim 10, wherein historic analysis is based on call detail records.

16. The system of claim 10, wherein network devices comprise at least one of SIP proxy servers, media relay servers, or session border control servers.

17. The system of claim 10, wherein real-time call metrics comprise at least one of call setup per second (CPS), simultaneous sessions, actual call duration (ACD), answer seizure ratio (ASR), network efficiency ratio, impaired calls, blocked calls, call attempts, call counts, one-way audio, no audio, dropped audio, excluded calls, and latency, high jitter, and high packet loss.

18. The system of claim 10, wherein the network resources are virtual machines or cloud based resources.

19. A non-transitory computer readable medium for storing computer instructions that, when executed by at least one processor causes the at least one processor to perform a method for dynamic allocation of network resources for optimized voice capacity and quality management, comprising:
monitoring real-time call metrics and real-time network traffic capacity usage of a plurality of network devices having a network traffic capacity; and
adjusting the network traffic capacity based on analysis of historical network traffic and at least one of an analysis of the real-time call metrics or an analysis of the real-time network traffic capacity usage, wherein adjusting network capacity comprises one of activating additional network devices to increase the network traffic capacity or deactivating one or more of the plurality of network devices to decrease the network traffic capacity.

20. The computer readable medium of claim 19, wherein network devices comprise at least one of SIP proxy servers, media relay servers, or session border control servers.

21. The computer readable medium of claim 19, wherein real-time call metrics comprise at least one of call setup per second (CPS), simultaneous sessions, actual call duration (ACD), answer seizure ratio (ASR), network efficiency ratio, impaired calls, blocked calls, call attempts, call counts, one-way audio, no audio, dropped audio, excluded calls, and latency, high jitter, and high packet loss.

* * * * *